UNITED STATES PATENT OFFICE.

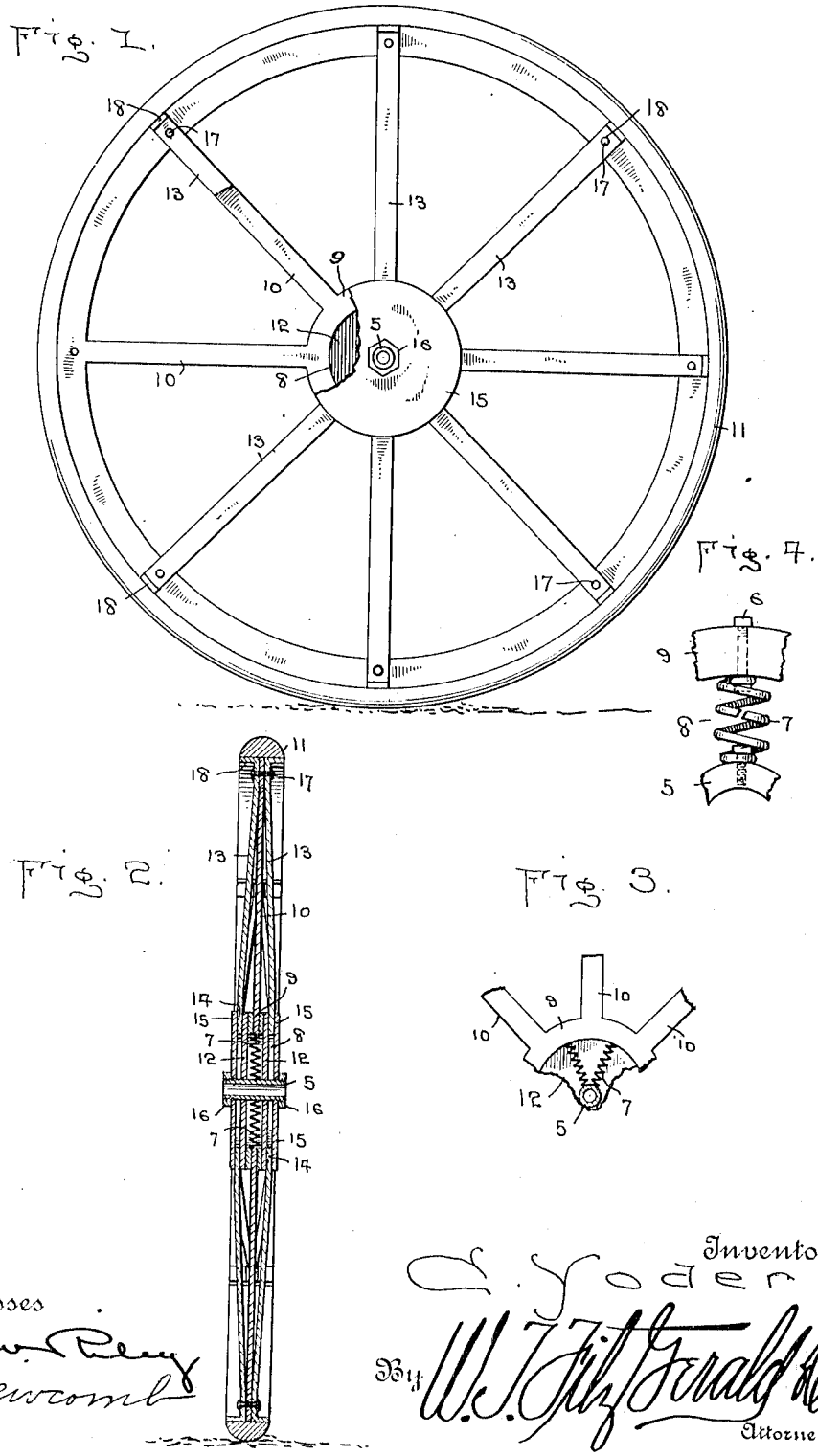

CALVIN YODER, OF DENVER, INDIANA.

WHEEL.

1,084,724.
Specification of Letters Patent.
Patented Jan. 20, 1914.

Application filed May 22, 1913. Serial No. 769,219.

*To all whom it may concern:*

Be it known that I, CALVIN YODER, a citizen of the United States, residing at Denver, in the county of Miami and State of Indiana, have invented certain new and useful Improvements in Wheels; and I do hereby declare the following to be a full, clear, and exact description of the invention, such as will enable others skilled in the art to which it appertains to make and use the same.

This invention relates to wheels, and particularly to that class known as "resilient wheels," especially adapted for motor driven vehicles.

The object of the invention is to generally improve the construction of such wheels with a view to increased utility, reasonable cost, improved operation, and decrease of liability to accidental breakage and rapid wear under ordinary usage.

With these objects in view the invention consists of an improved construction, arrangement and combination of parts of a wheel, which will be hereinafter fully described and afterward specifically claimed.

In order that this construction and operation may be readily comprehended, I have illustrated an improved embodiment of my wheel invention in the accompanying drawings and will now proceed to fully describe the same, in connection with said drawings, in which, Figure 1 represents a view in side elevation of a wheel constructed in accordance with my invention, the exterior washer being partly broken away. Fig. 2 represents a diametrical sectional view, and, Figs. 3 and 4 represent fragments of the wheel which will be hereinafter particularly referred to.

Like reference characters mark the same parts in all of the figures.

Referring specifically to the drawings, 5 indicates a central tube which in this wheel takes the place of the axle skein. Suitably secured, as for instance by bolt and nut 6, in radially extending positions, are springs 7. which springs are inclosed in a recess 8 within a central ring 9, either built upon or secured to the inner ends of spokes 10, said spokes being secured at their outer ends to any suitable tire 11 in a manner to be hereinafter described. The spring thus secured between the central tube 5 and the inner ends of the spokes, will support the spokes and tire resiliently no matter in what direction strain is brought upon them, and, in order to properly inclose the springs against dirt and other outside influences, washers 12, of a diameter equal to the inclosing ring 9, are mounted upon the central tube 5 closely adjacent to said ring 9, thus forming a closed housing for the springs. the washers 12 permitting of the sliding of the ring 9 under any strain on the spokes or tire.

In order to be able to make the spokes as light as possible and at the same time to stiffen them sufficiently to withstand any ordinary lateral strain brought against them, I have provided braces 13 which are mounted on the side of the spokes in the same radial planes and which carry or are secured to at their inner ends, rings 14 of the same diameter as the rings 9, both inside and out. Such rings surrounding the central tube 5 in the same manner as do the rings 9, and their openings being of the same diameter, they are permitted to slide on the washers 12, with the spokes, when strain has been brought upon the latter or the tire. Finally I mount snugly on the central tube washers 15 which are held thereon by means of threaded rings 16, such holding rings being adjusted properly to permit of the movement of the braces 13, as hereinbefore described. The braces 13 are thus inclined from their inner ends to their outer ends at considerable of an angle from the spokes, being secured to the spokes at their outer ends, by any suitable means, such for instance as bolts 17 and being preferably provided with peripheral outwardly projecting flanges 18, which, with the outer ends of the spokes, form rims upon which the tire 11 is secured.

From the foregoing it will be obvious that the springs will be thoroughly protected from dust and dirt and all the parts may be suitably lubricated in any approved manner.

While I have specifically described the construction and operation of the component parts, it will be obvious to those skilled in the art that slight changes and variations may be made therein without departing from the spirit and scope of the invention.

Having thus fully described my invention, what I claim as new and desire to secure by Letters Patent of the United States is:

A resilient wheel comprising spokes mounted at their inner ends on rings, a tube centrally placed within and projecting laterally beyond the rings, radial springs inclosed within the rings and connected at their respective outer and inner ends with said rings and tube, two washers fitted on the tube on each side of the spring-inclosing rings, rings slidably fitted between the washers, braces carried by said last named rings and rigidly secured to the spokes at their outer ends, and means for holding the parts on the central tube.

In testimony whereof I have signed my name to this specification in the presence of two subscribing witnesses.

CALVIN YODER.

Witnesses:
C. E. SMITH,
N. L. PATTERSON.